United States Patent [19]

Misumida

[11] 4,452,224
[45] Jun. 5, 1984

[54] CASSEROLE SET

[75] Inventor: Yoshiro Misumida, Osaka, Japan

[73] Assignee: Tofle Kabushiki Kaisha, Osaka, Japan

[21] Appl. No.: 404,718

[22] Filed: Aug. 3, 1982

[30] Foreign Application Priority Data

Jul. 23, 1982 [JP] Japan .................. 57-129428

[51] Int. Cl.³ .................................. A41J 37/00
[52] U.S. Cl. .................. 126/41 R; 126/30; 126/25 R
[58] Field of Search ........... 126/25 R, 41 R, 30; D7/354, 356

[56] References Cited

U.S. PATENT DOCUMENTS

| | | | |
|---|---|---|---|
| 179,623 | 7/1876 | Sturdy | 126/30 |
| 243,315 | 6/1881 | Seyler | 126/30 |
| 3,931,805 | 1/1976 | Nelson | 126/25 R |

OTHER PUBLICATIONS

Tableware International, Feb. 1982, p. 108, 'Vision' by Corning.

*Primary Examiner*—Samuel Scott
*Assistant Examiner*—G. Anderson
*Attorney, Agent, or Firm*—Birch, Stewart, Kolasch & Birch

[57] ABSTRACT

A casserole set includes a gas burner within a portable cooking stove, volcanic stones above the gas burner, and a transparent or semi-transparent pan comprising synthetic resins or heat resisting glass on the cooking stove. Cooking is accomplished by heating the volcanic stones with the gas burner.

4 Claims, 2 Drawing Figures

CASSEROLE SET

BACKGROUND OF THE INVENTION

The present invention relates to a casserole set in which cooking is achieved by a gas burner which heats pumice stones or volcanic stones red-hot in a portable cooking stove. A thin transparent or semi-transparent pan made of synthetic resins is put on the cooking stove in the Japanese style.

Conventionally, in casserole cooking in Japanese style, cooking has been achieved by a charcoal fire in the cooking stove and a pan on the stove holding soup stock, vegetables, fish and the like. However this method is not adapted to mass production of the casserole set, and the apparatus is inconvenient to carry and use because of its weight.

The present invention improves upon the above conventional casserole set and provides a casserole set which can be massproduced, be simply set up, and be easily used whereby the caserole cooking is enjoyed in a purely Japanese style.

BRIEF DESCRIPTION OF THE DRAWINGS

The drawings illustrate an embodiment of the present invention.

DESCRIPTION OF THE PREFERRED EMBODIMENT

Figure 1:
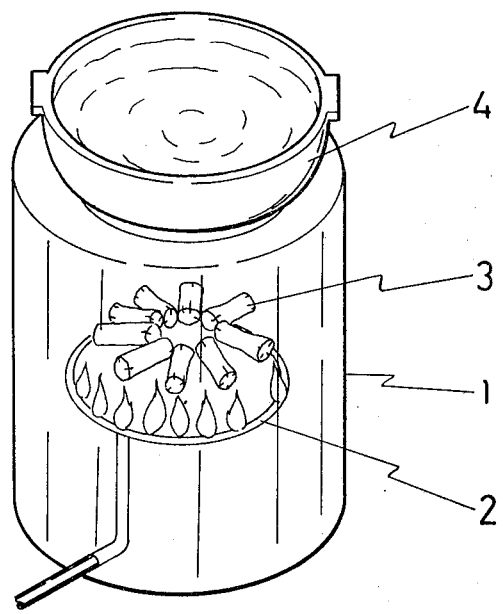
FIG. 1 is a perspective view of the invention, partly in section.

FIG. 1 illustrates a combined casserole set in accordance with the invention. Cooking is achieved by a gas burner 2 housed in a portable cooking stove 1. Pumice stones 3 or volcanic stones are supported above the gas burner 2. A thin transparent or semi-transparent molded pan 4 made of synthetic resin, i.e., fluoric resin, acrylic resin, polycarbonate resin, etc., is laid on the cooking stove 1. Soup stock made from dried bonito, tangle, mushroom and the like, vegetables, fish, shellfish, bean curd, etc. is put into the pan along with necessary seasonings. A pan made of heat resistant glass may be used instead of the above pan.

Figure 2:
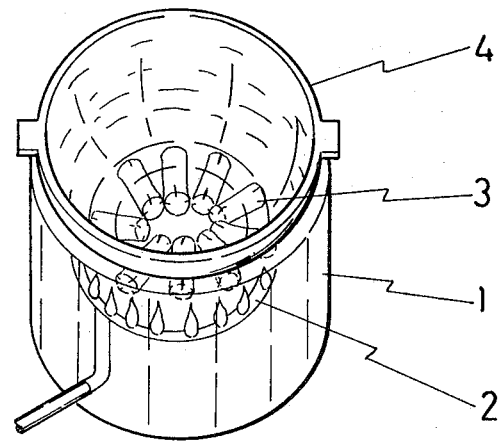
FIG. 2 is a different perspective view, also partly in section.

The present invention as described above can be readily mass-produced. While much more convenient and lighter in weight than the prior art device described above, the present invention provides a casserole set which closely simulates a purely Japanese style of cooking in that the red-hot pumice stones simulating a charcoal fire may be viewed through the pan 4 which is transparent or semi-transparent as illustrated in FIG. 2.

What we claim is:

1. A casserole cooking apparatus for simulating Japanese style charcoal-fire casserole cooking, consisting essentially of:

a housing having an opening in the top portion thereof;

volcanic rocks supported within said housing beneath said opening;

a gas burner within said housing for heating said rocks to a temperature sufficiently high to cause said rocks to glow; and a transparent vessel supported by said housing on the periphery of said opening for permitting viewing of said rocks during cooking of foodstuff within said vessel.

2. An apparatus as in claim 1, wherein said vessel is a thin-walled vessel formed of a synthetic resin selected from the group consisting of fluoric resin, acrylic resin and polycarbonate resin.

3. A casserole cooking apparatus for simulating Japanese style charcoal-like casserole cooking, consisting essentially of:

a generally cylindrical housing having a circular opening in the uppermost portion thereof;

volcanic rocks supported within said housing beneath said opening;

a burner within said housing beneath said rocks for heating said rocks to a high temperature for causing said rocks to glow; and a transparent vessel having a configuration which conforms to and is supported above said rocks by the periphery of said circular opening for permitting viewing of said glowing rocks during use of said apparatus.

4. An apparatus as in claim 3, wherein said vessel is a thin-walled vessel formed of a synthetic resin selected from the group consisting of fluoric resin, acrylic resin and polycarbonate resin.

* * * * *